Aug. 17, 1926.
W. H. SPAYD
1,596,321
VEHICLE SPRING CLAMP
Filed May 21, 1925
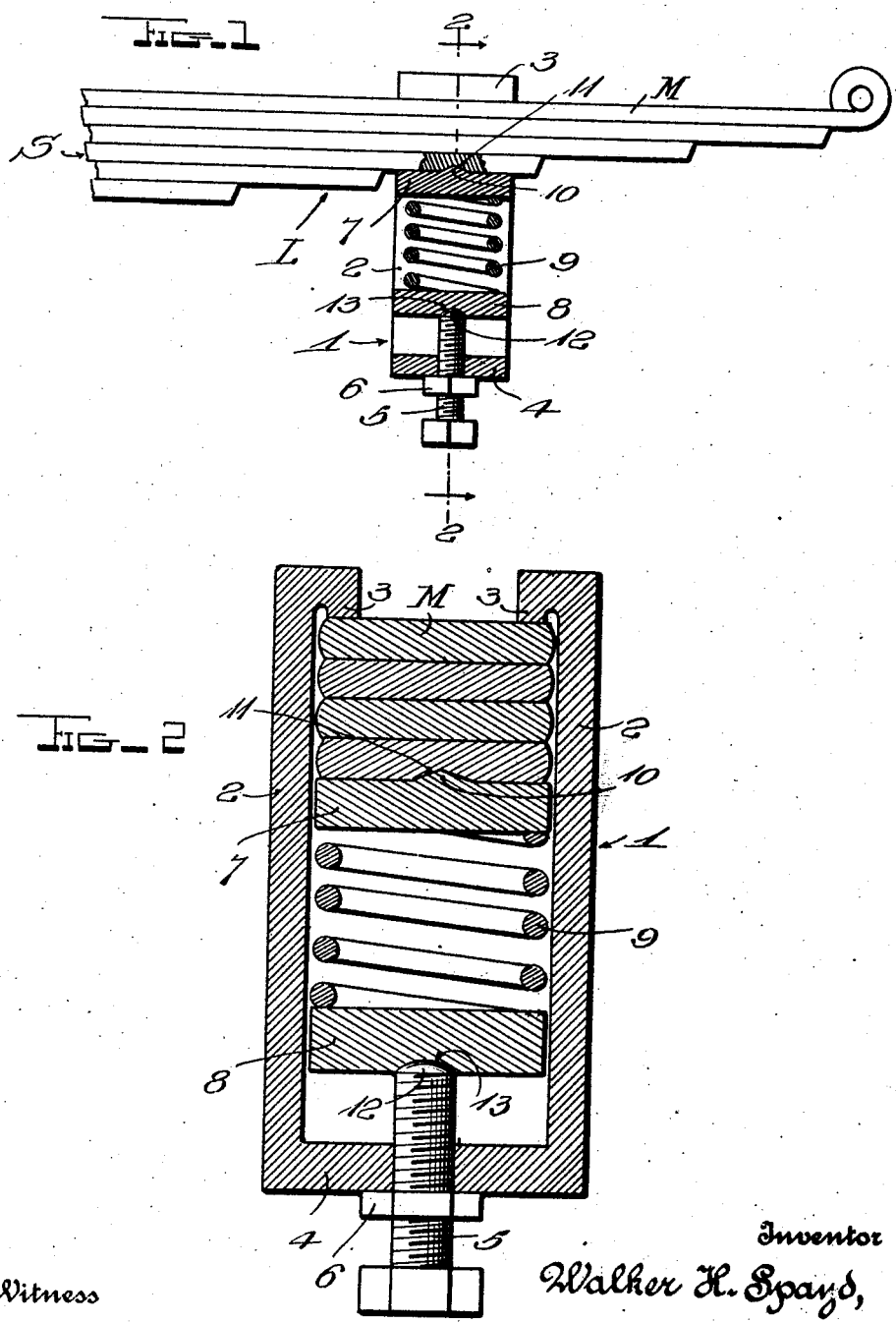
Inventor
Walker H. Spayd,
By H. B. Wilson Yeo
Attorneys
Witness

UNITED STATES PATENT OFFICE.

WALKER H. SPAYD, OF VAN WERT, OHIO.

VEHICLE SPRING CLAMP.

Application filed May 21, 1925. Serial No. 31,866.

My invention aims to provide an exceptionally simple and inexpensive, easily attached, easily adjusted and efficient clamp for application to vehicle springs, said clamp serving to place the proper amount of friction between the spring leaves, assisting in preventing breaking of such leaves and acting effectively as a shock and recoil absorber.

With the foregoing in view, the invention resides in the novel subject matter hereinafter described and claimed, the description being supplemented by the accompanying drawing.

Figure 1 is a side elevation partly in section showing the application of my invention to a vehicle spring.

Figure 2 is a vertical sectional view on line 2—2 of Fig. 1.

In the drawing above briefly described, which illustrates the preferred form of construction, the numeral 1 designates an elongated U-shaped yoke whose arms 2 are adapted to straddle a spring S, the free ends of said arms being provided at their inner sides with shoulders 3 to contact with the master leaf M of said spring, said shoulders being preferably formed by bending the ends of the arms substantially upon themselves as shown clearly in Fig. 2. The yoke 1 is of a length to space its arm-connecting portion 4 outwardly from the short-leaf side L of the spring S, and an adjusting screw 5 is threaded through said portion 4, this screw being provided with a lock nut 6 or other means for holding it against accidental rotation. Disposed between the yoke arms 2, are two plates 7 and 8, and a coiled compression spring 9 is interposed between said plates, with its ends engaged therewith and suitably secured with respect thereto. The plate 7 is adapted to engage the free end of one of the spring leaves, and in the present showing, this plate is formed with a conical projection 10 for reception in a shallow recess 11 formed in said spring leaf, thus holding the plate against sliding on the leaf. The other plate 8 engages the inner end of the screw 5, which end is preferably convex as indicated at 12, the plate 8 being formed with a concave socket 13 receiving said convex screw end, so as to rockably mount said plate.

When applying the device to a spring, it is turned to a horizontal position and slipped transversely across the narrow end of the spring. It is then righted to a vertical position and slid to the point at which it is to be permanently located, one of the spring leaves having been previously formed with the recess 11. When this initial installing of the yoke is taking place, the screw 5 is of course loosened to provide ample space between the shoulders 3 and the plate 7, for easy adjustment of the device into proper position, or if desired, both plates 7 and 8 and the spring 9 may then be removed from the yoke. When the device is fully installed and the screw 5 tightened to the required extent, the desired amount of friction is placed upon the spring leaves, thus insuring proper operation of the spring and effectively absorbing shocks and recoil. As the spring leaves slide upon each other during movement of the vehicle over rough roads, the plate 7 moves bodily with the leaf with which it contacts, whereas the yoke 1 which is engaged with the master leaf M remains stationary. Under such conditions, the spring 9 of course yields to some extent and the plate 8 may rock upon the convex inner end of the screw 5, so that movement of the spring leaves is in no manner retarded as would necessarily take place if the plate 7 were not permitted to move horizontally with respect to the yoke 1.

The device is exceptionally simple and inexpensive when manufactured in the form herein disclosed and such form is therefore preferably followed. However, within the scope of the invention as claimed, modifications may of course be made.

I claim:

A device of the character set forth for application to a bank of leaves of a vehicle spring comprising a U-shaped yoke to straddle the spring and having its cross portion provided with a centrally arranged threaded aperture and the unconnected ends of its two arms bent inwardly at right angles to form shoulders to rest in a fixed position on the master leaf of the spring, the space between said shoulders permitting the yoke to be slipped transversely over the small end of the spring and then turned and slid longitudinally on the leaves to a position adjacent the end of one of the short leaves, said yoke being of a length to space its cross portion outwardly from said short leaf, an adjusting screw in the aperture of the cross portion of the yoke and having a convex inner end, two spaced transverse plates within the yoke arms, and a coiled compression spring between said plates, one of said plates having a socket to receive the convex end of the screw to permit pivotal movement on said screw, and the other plate having a projection to enter a recess in said short leaf of the spring to prevent sliding movement of one with respect to the other, for the purposes set forth.

In testimony whereof I have hereunto affixed my signature.

WALKER H. SPAYD.